May 19, 1964                R. A. MIXER ETAL                3,133,877
                    METHODS AND APPARATUS FOR CHLORINATION
                            Filed Jan. 20, 1958
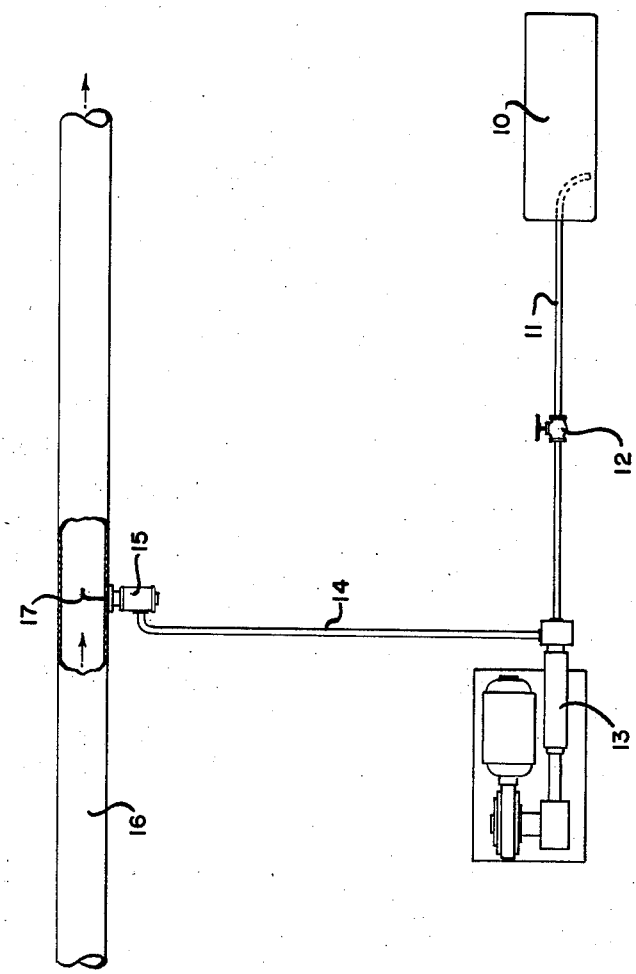
INVENTORS
Richard A. Mixer &
James Girand

United States Patent Office 3,133,877
Patented May 19, 1964

3,133,877
METHODS AND APPARATUS FOR CHLORINATION
Richard A. Mixer, 1034 Salem Road, Union, N.J., and James Girand, Westfield, N.J.
Filed Jan. 20, 1958, Ser. No. 709,888
15 Claims. (Cl. 210—62)

This invention relates to methods and apparatus for adding liquified gases to fluids and particularly to methods and apparatus for chlorinating water with chlorine in the liquid phase. One of the most common examples of the need for a method and apparatus for adding liquified gases to fluids is the chlorination of water. Accordingly the invention will be particularly described and exemplified by a chlorination method and apparatus.

It has long been the practice in the industry to inject gaseous chlorine into potable water for sterilization purposes. Special equipment is used which meters the gaseous chlorine from bottles of liquid chlorine and dissolves the gas into the water stream. The use of gaseous chlorine for sterilizing water involves many problems. It requires cumbersome and expensive equipment to meter the large quantities of chlorine. As a result, field chlorination is a major problem and relatively difficult of accomplishment. The rapid draw-off of gaseous chlorine causes freezing of the chlorine due to the change in phase from liquid to gas, which is another major problem. Another serious problem in using gaseous chlorine is the time necessary for the chlorine gas to dissolve in water together with the problem of metering the gas with any degree of accuracy. On the other hand, the problems involved in handling liquid chlorine have heretofore been even greater than those outlined above in the case of gaseous chlorine. As a result, liquid chlorine has not been used for sterilization of water. The problems involved in handling chlorine are described in "Principles of Handling Chlorine" by V. W. Longworthy, in Water and Sewage Work, Reference and Data Edition, May 1954. In that article, the problems of handling liquid chlorine are pointed out and it is indicated that liquid chlorine is not a satisfactory substitute for gaseous chlorine because of the many problems involved in its handling.

The foregoing problems are not limited to the water sterilization art but are common to other industrial situations where chlorine or other liquified gases are used. For example the same problems arise in chemical bleaching, color reduction and chemical processing generally.

We have discovered an apparatus and method of injecting liquified gases into a body of water or other liquid which eliminates all of the diffculties heretofore encountered in the use of liquified gases and which is far simpler, much less expensive and much less cumbersome than the methods heretofore used for treating liquids with gases in the liquid phase.

We provide preferably a source of liquified gas metering means receiving liquified gas from said source to deliver a metered amount, pressure receiving means acting on the metered liquified gas to raise its pressure to a level above that of both the source of liquified gas and the liquid being treated, injector means receiving the liquified gas from the pressure raising means to deliver it in the liquid state into the liquid being treated and pressure control means at the injector means limiting flow of liquified gas into the injector to maintain a pressure greater than the pressure of the source of liquified gas and the liquid being treated on the liquified gas as it enters the injector means. Preferably, the metering means is a metering pump which also acts on the liquified gas to raise its pressure; the pressure control means at the injector means is preferably a back pressure valve which holds the liquified gas coming from the metering pump to maintain it under a pressure greater than the pressure of either the source or the liquid into which it is to be injected. Preferably, we provide a silver tube at the back pressure valve entering the liquid to be treated and delivering the liquified gas in the liquid form from the back pressure valve to the liquid being treated.

The apparatus and method of this invention will be perhaps best understood by reference to the following description of a preferred embodiment as applied to sterilization of water with liquid chlorine in a water main and to the accompanying drawing illustrating an apparatus for this purpose.

Referring to the drawings we have illustrated a chlorine cylinder 10 holding chlorine under pressure. The cylinders 10 are conventional commercial tanks or cylinders in which the liquid chlorine is under a pressure of approximately 125 p.s.i. The pressure of the chlorine results from the vapor pressure of the liquid chlorine at the ambient temperature. Chlorine is carried from the cylinder 10 through a line 11 and a shut-off valve 12 to a metering pump 13 which delivers liquid chlorine to a delivery line 14. The delivery line 14 carries the metered liquid chlorine to a back pressure valve 15. This back pressure valve 15 is set at a pressure greater than the pressure of the chlorine in cylinder 10 and the water into which the chlorine is to be delivered. The water to be treated is carried in a water main 16. The pressure of such water is usually between 60 and 100 pounds. Chlorine from the back pressure valve is injected into the center of the water main through a silver tube 17. Preferably the liquid chlorine in the line 14 is maintained in the pressure range of 150 p.s.i. to 200 p.s.i. for ordinary water purification. The stroke on the metering pump 13 is set to the desired volume of liquid required. The pressure of the liquid is then increased by the pump from the pressure in the cylinder 10 (about 125 p.s.i.) to a minimum pressure of about 150 p.s.i. The liquid under pressure is delivered from the back-pressure valve 15 to the silver tube 17, which is preferably a $\frac{1}{16}''$ diameter tube which projects through the wall in the water main 16. The orifice of tube 17 is preferably located at substantially the middle of the water main. Because of the pressure in the water main (usually 60 to 100 pounds) and the relatively short distance and small diameter of the silver tube 17, the liquid phase of the chlorine will be maintained and the chlorine in the liquid phase will go directly into solution in the water without bubbling or flashing. There is accordingly substantially no time lost in dissolving the chlorine in the water and no loss of chlorine as escaping chlorine gas.

This method and apparatus overcomes all of the objections raised in the Longworthy article mentioned above. The back-pressure valve maintains a constant pressure on the liquid chlorine entering the water main. The metering pump 13 can be controlled so as to maintain a given pressure and volume of chlorine gas flowing into line 14. This is a very accurate volume controlled operation and could be controlled automatically by conventional recording and control mechanisms. Since the liquid chlorine is far more readily diffused in the water than is gaseous chlorine because no change of phase is required, the efficiency of this method is far greater than conventional methods.

It is thus evident that the present invention is a marked improvement over practices heretofore available and that the apparatus and invention are simple in operation, inexpensive and easily used, and that they overcome all of the problems outlined hereinabove which have plagued the water sterilization and related arts.

The invention may of course be applied to treating liquid outside of a main. For example water may be chlorinated in other types of vessels such as tanks, reservoirs, basins, lakes, rivers or streams with the above described apparatus and techniques. Likewise other liquified gases may be added to liquids to be treated in precisely the same way with equally improved results over those obtained when the gas is added in the gaseous phase.

While we have illustrated and described a preferred practice and apparatus within the scope of this invention, it will be understood that the invention may be otherwise practiced and embodied within the scope of the following claims.

We claim:

1. A method of injecting liquified gas into a liquid to be treated comprising the steps of supplying liquid gas at a pressure sufficient to maintain the gas in the liquid state, metering a portion of said liquid gas to be added to the liquid being treated, raising the pressure of said metered liquid gas to a level above the pressure of both the supplied liquid gas and the liquid to be treated, and injecting the liquid gas into the liquid being treated.

2. A method of injecting liquified gas into a water main comprising the steps of supplying liquid gas at a pressure sufficient to maintain the gas in the liquid state, metering a portion of said liquid gas to be added to the liquid to be treated, raising the pressure of said metered liquid gas to a level above the pressure of both the supplied liquid gas and the liquid to be treated, and injecting the liquid gas into the liquid being treated.

3. A method of injecting liquid chlorine into a water main comprising the steps of supplying liquified gas in the liquid state under a pressure equal to the vapor pressure of the gas at the ambient temperature, metering a portion of said liquid gas to be added to the liquid being treated, raising the pressure of said metered liquid gas to a level above the pressure of both the supplied liquid gas and the liquid to be treated, and injecting the liquified gas into the liquid being treated.

4. A method of injecting liquified gas into a flowing body of liquid to be treated comprising the steps of supplying liquid gas at a pressure sufficient to maintain the gas in the liquid state, metering a portion of said liquid gas to be added to the liquid being treated, regulating the metering to the flow of liquid being treated, raising the pressure of said metered liquid gas to a level above the pressure of both the supplied liquid gas and the liquid to be treated, and injecting the liquid gas into substantially the center of the body of liquid being treated.

5. An apparatus for treating liquids with a liquified gas comprising a source of liquid gas, metering means receiving liquid gas from said source to deliver a metered amount, pressure raising means acting on the metered liquid gas to raise its pressure to a level above that of both the source of liquid gas and the liquid being treated, injector means receiving the liquid gas from the pressure raising means to deliver it in the liquid state in the liquid being treated and pressure control means at the injector means limiting flow of liquid gas into the injector to a pressure greater than the pressure of both the source of liquid gas and the liquid being treated.

6. An apparatus for treating liquids with a liquified gas comprising a source of liquid gas under pressure equal to the vapor pressure of the gas at the ambient temperature, metering means receiving liquid gas from said source to deliver a metered amount, pressure raising means acting on the metered liquid gas to raise its pressure to a level above that of both the source of liquid gas and the liquid being treated, injector means receiving the liquid gas from the pressure raising means to deliver it in the liquid state in the liquid being treated and a pressure control valve at the injector means limiting flow of liquid gas into the injector to a pressure greater than the pressure of each of the source of liquid gas and the liquid being treated.

7. An apparatus for treating liquids with a liquified gas comprising a source of liquid gas, a metering and pressure pump receiving liquid gas from said source to deliver a metered amount at a pressure above that of both the source of liquid gas and the liquid being treated, injector means receiving the liquid gas from the pump to deliver it in the liquid state into the water being treated and a pressure control valve at the injector means limiting flow of liquid gas into the injector to a pressure greater than the pressure of each of the source of liquid gas and the liquid being treated.

8. A method of injecting liquid chlorine into a liquid to be treated comprising the steps of supplying chlorine at a pressure sufficient to maintain the chlorine in the liquid state, metering a portion of said liquid chlorine to be added to the liquid being treated, raising the pressure of said metered liquid chlorine to a level above the pressure of both the supplied chlorine and the liquid to be treated, and injecting the chlorine into the liquid being treated.

9. A method of injecting liquid chlorine into a body of water to be treated comprising the steps of supplying of chlorine at a pressure sufficient to maintain the chlorine in the liquid state, metering a portion of said liquid chlorine to be added to the water, raising the pressure of said metered liquid chlorine to a level above the pressure of both the supplied chlorine and the water to be treated, and injecting the chlorine into the water being treated.

10. A method of injecting liquid chlorine into a body of water to be treated comprising the steps of supplying of chlorine in the liquid state under a pressure equal to the vapor pressure of chlorine at the ambient temperature, metering a portion of said liquid chlorine to be added to the water, raising the pressure of said metered liquid chlorine to a level above the pressure of both the supplied chlorine and the water to be treated, and injecting the chlorine into the water being treated.

11. A method of injecting liquid chlorine into a flowing body of water comprising the steps of supplying chlorine at a pressure sufficient to maintain the chlorine in the liquid state, metering a portion of said liquid chlorine to be added to the water regulating the metering to the flow of water, raising the pressure of said metered liquid chlorine to a level above the pressure of both the supplied chlorine and the water to be treated, and injecting the chlorine into substantially the center of the body of water being treated.

12. An apparatus for treating liquid with liquid chlorine comprising a source of liquid chlorine, metering means receiving liquid chlorine from said source to deliver a metered amount, pressure raising means acting on the metered liquid chlorine to raise its pressure to a level above that of both the source of liquid chlorine and the liquid being treated, injector means receiving the liquid chlorine from the pressure raising means to deliver it in the liquid state in the liquid being treated and pressure control means at the injector means limiting flow of liquid chlorine into the injector to a pressure greater than the pressure of pressure of the source of liquid chlorine and the liquid being treated.

13. An apparatus for treating water with liquid chlorine comprising a source of liquid chlorine under pressure equal to the vapor pressure of chlorine at the ambient temperature, metering means receiving liquid chlorine from said source to deliver a metered amount, pressure raising means acting on the metered liquid chlorine to raise its pressure to a level above that of both the source of liquid chlorine and the water being treated, injector means receiving the liquid chlorine from the pressure raising means to deliver it in the liquid state in the water being treated and a pressure control valve at the injector means limiting flow of liquid chlorine into the injector to a pressure greater than the pressure of each of the source of liquid chlorine and the water being treated.

14. An apparatus for treating water with liquid chlorine comprising a source of liquid chlorine, a metering and pressure pump receiving liquid chlorine from said source to deliver a metered amount at a pressure above that of both the source of liquid chlorine and the water being treated, injector means receiving the liquid chlorine from the pump to deliver it in the liquid state into the water being treated and a pressure control valve at the injector means limiting flow of liquid chlorine into the injector to a pressure greater than the pressure of each of the source of liquid chlorine and the water being treated.

15. An apparatus for treating water in a water main with liquid chlorine comprising a source of liquid chlorine, a metering and pressure pump receiving liquid chlorine from said source to deliver a metered amount at a pressure above that of both the source of liquid chlorine and the water being treated, a curved corrosion resistant injector nozzle extending through the wall of the water main and directed to discharge liquid chlorine from the pressure pump in the liquid state in the water being treated substantially on the axis of the main and a pressure control valve at the injector means limiting flow of liquid chlorine into the injector to a pressure greater than the pressure of each of the source of liquid chlorine and the water being treated.

References Cited in the file of this patent

UNITED STATES PATENTS

| | | |
|---|---|---|
| 1,007,647 | Darnall | Oct. 31, 1911 |
| 1,142,361 | Ornstein | June 8, 1915 |
| 1,609,757 | MacMahon | Dec. 7, 1926 |
| 1,962,571 | Ornstein | June 12, 1934 |
| 2,272,818 | Petroe | Feb. 10, 1942 |
| 2,606,150 | Thorp | Aug. 5, 1952 |
| 2,678,541 | Sheen | May 18, 1954 |

OTHER REFERENCES

"Principles of Chlorine Gas Feeders," Pearce, Water and Sewage Works, October 1954, vol. 101, No. 10, pages 450–457, pages 451 and 453 particularly relied on. (Photostat copy in Div. 67.)